(12) United States Patent
Maebashi et al.

(10) Patent No.: US 9,234,774 B2
(45) Date of Patent: Jan. 12, 2016

(54) LIGHTING STRUCTURE FOR METER DEVICE

(71) Applicant: Yazaki Corporation, Tokyo (JP)

(72) Inventors: Tetsuya Maebashi, Shimada (JP); Masaaki Sano, Shimada (JP)

(73) Assignee: Yazaki Corporation, Tokyo (JP)

(*) Notice: Subject to any disclaimer, the term of this patent is extended or adjusted under 35 U.S.C. 154(b) by 1 day.

(21) Appl. No.: 14/086,243

(22) Filed: Nov. 21, 2013

(65) Prior Publication Data

US 2014/0078713 A1 Mar. 20, 2014

Related U.S. Application Data

(63) Continuation of application No. PCT/JP2012/065055, filed on Jun. 6, 2012.

(30) Foreign Application Priority Data

Jun. 6, 2011 (JP) .................. 2011-126679

(51) Int. Cl.
*F21V 9/00* (2015.01)
*G01D 13/04* (2006.01)
*B60K 35/00* (2006.01)

(52) U.S. Cl.
CPC ............. *G01D 13/04* (2013.01); *B60K 35/00* (2013.01); *B60K 2350/203* (2013.01)

(58) Field of Classification Search
CPC ....... G01D 13/02; G01D 13/04; G01D 13/22; G01D 13/265; B60K 35/00; B60K 2350/203; B60K 2350/2034; B60K 2350/206

USPC .......... 362/23.01, 23.07–23.14, 23.16–23.21, 362/489, 511

See application file for complete search history.

(56) References Cited

U.S. PATENT DOCUMENTS

| 5,706,757 A | 1/1998 | Hashimoto et al. |
| 6,854,416 B2 * | 2/2005 | Breinich et al. ............... 116/202 |

(Continued)

FOREIGN PATENT DOCUMENTS

| CN | 1271455 A | 10/2000 |
| CN | 1759301 A | 4/2006 |

(Continued)

OTHER PUBLICATIONS

International Search Report dated Nov. 7, 2012 issued in International Application No. PCT/JP2012/065055 (PCT/ISA/210).

(Continued)

*Primary Examiner* — Jason Moon Han
(74) *Attorney, Agent, or Firm* — Sughrue Mion, PLLC

(57) ABSTRACT

A lighting structure for a meter device is provided to include a dial, a rotating shaft having a light transmitting property, which is provided in a back surface side of the dial and rotates by receiving a turning force from a motor, a light transmitting pointer which is provided integrally with a light transmitting pointer shaft having a hole formed in a base end part into which an end part of the rotating shaft is inserted and fixed and rotates along a surface of the dial, and a light source which outputs the illuminating lights incident on a base end part of the rotating shaft. The pointer shaft includes a first laterally light-dispersing unit formed with a recessed part recessed toward the light source in an end part over the hole for dispersing a part of the illuminating lights incident on the pointer shaft toward the dial.

9 Claims, 13 Drawing Sheets

(56) References Cited

U.S. PATENT DOCUMENTS

| | | |
|---|---|---|
| 7,379,182 B2 * | 5/2008 | Han .............................. 356/364 |
| 7,675,428 B2 | 3/2010 | Pala et al. |
| 7,771,069 B2 | 8/2010 | Werman et al. |
| 8,347,807 B2 | 1/2013 | Sigg et al. |
| 2002/0108555 A1 | 8/2002 | Breinich et al. |
| 2006/0238993 A1 | 10/2006 | Obata et al. |
| 2008/0174416 A1 | 7/2008 | Pala et al. |
| 2009/0173271 A1 | 7/2009 | Sigg et al. |
| 2009/0196013 A1 | 8/2009 | Mezouari |
| 2009/0223436 A1 | 9/2009 | Werman et al. |

FOREIGN PATENT DOCUMENTS

| | | |
|---|---|---|
| CN | 2929658 Y | 8/2007 |
| EP | 1217335 A2 | 6/2002 |
| JP | 3291732 B2 | 6/2002 |
| JP | 2002-277290 A | 9/2002 |
| JP | 2009-537844 A | 10/2009 |
| WO | 99/16081 A1 | 4/1999 |

OTHER PUBLICATIONS

Written Opinion dated Nov. 7, 2012 issued in International Application No. PCT/JP2012/065055 (PCT/ISA/237).
Communication dated Feb. 17, 2015 issued by the Japanese Patent Office in counterpart Japanese Patent Application No. 2011-126679.
Office Action dated Apr. 24, 2015 issued by the State Intellectual Property Office of the People's Republic of China in counterpart Chinese Patent Application No. 201280028026.6.
Office Action issued Oct. 22, 2015, issued by the European Patent Office in counterpart European Patent Application No. 12732718.7.

* cited by examiner

LIGHTING STRUCTURE FOR METER DEVICE

CROSS REFERENCE TO RELATED APPLICATIONS

This application is a continuation of PCT application No. PCT/JP2012/065055, which was filed on Jun. 6, 2012 based on Japanese Patent Application (No. 2011-126679) filed on Jun. 6, 2011, the contents of which are incorporated herein by reference.

BACKGROUND OF THE INVENTION

1. Field of the Invention

The present invention relates to a lighting structure for a meter device mounted on a vehicle or the like.

2. Description of the Related Art

In such a meter device mounted on a vehicle or the like, a dial having characters, numeric characters and scales or the like provided is ordinarily lighted from a back surface side by a dedicated light source or a pointer which indicates the characters or the numeric characters on the dial is lighted (for instance, see Japanese Patent No. 3291732).

Namely, this meter device is an indicating meter useful as a speed meter of a motor vehicle. As shown in FIG. 14, a motor casing 102 is attached between a printed circuit board 101 and a dial 107. A rotating shaft 106 formed with a hollow shaft is supported by shaft support parts 104 and 105 of the motor casing 102. To the rotating shaft 106, a pointer shaft 110 formed integrally with a pointer 109 is attached. The pointer 109 is rotated by a motor provided in the motor casing 102 which is not shown in the drawing through the rotating shaft 106. Further, in the rotating shaft 106, an LED (Light Emitting Diode) 111 is arranged as a light source. The LED 111 is fixed to the printed circuit board 101 and outputs illuminating lights to a light receiving surface 109A of the pointer 109. The illuminating lights incident on the pointer 109 are reflected on a reflecting surface 109B to allow the pointer to emit the lights and illuminate the pointer 109. In this meter device, for illuminating the dial 107, dedicated light sources, which are not shown in the drawing, are separately arranged at a plurality of parts below the dial 107.

As such a meter device, a meter device is also known which is formed so as to improve a light emitting efficiency of a pointer (for instance, see JP-T-2009-537844).

As shown in FIG. 15, this meter device includes a motor casing 201, a pointer 202 guided through a protruding part 201A provided in a main body of the motor casing 201 and used as a bearing, a light source 205 formed with an LED spaced by a distance H from a lower end part 203A of a pointer shaft 203 provided in a base part of the pointer 202 and arranged just below a hollow shaft 204 and a printed circuit board 206 on which the light source 205 is mounted.

In this meter device, the pointer shaft 203 of the pointer 202 has a converging surface formed to be convex in the lower end part 203A in order to collect illuminating lights emitted by the light source 205 in an optimum way. The pointer 202 has the pointer shaft 203 of a cylindrical form and the lower end part 203A thereof preferably has a hemispherical form or a convex form, but, may have other forms than the above-described forms. In such a specific form, a focused state can be maintained so that the emission of the lights by the light source 205 is parallel to an axis of the pointer shaft 203. In this meter, a dial is lighted by arranging a plurality of dedicated light sources below the dial not shown in the drawing like the above-described meter device.

SUMMARY OF THE INVENTION

In the above-described meter devices, since an optical axis of the light source is set on the pointer shaft, the lights from the light source can be effectively transmitted to the pointer to illuminate the pointer. Especially, even when the pointer points any direction, no problem arises in view of a point that unevenness of an illumination is suppressed.

On the other hand, in order to allow the dial to emit lights, for instance, a dial illuminating light source is supposed to be newly provided separately from the above-described light source to transmit lights to the dial from the new light source. However, in the meter device in which the above-described light source is arranged just below a center of the dial, it is physically impossible to further arrange the dial illuminating light source just below the center of the dial.

From these circumstances, in order to light the dial equally as much as possible, a plurality of light sources needs to be arranged at suitable intervals below the dial separately from the light source for allowing the pointer to emit lights and illuminate the pointer. However, this structure causes a cost to increase.

The present invention is devised by considering the above-described circumstances, and it is an object of the present invention to provide a lighting structure for a meter device which can sufficiently illuminate a dial as well as a pointer by one light source at least.

In order to achieve the above-described object, a lighting structure for a meter device according to the present invention may be formed by any one of below-described (1) to (7).

(1) A lighting structure for a meter device, including: a dial; a rotating shaft having a light transmitting property, which is provided in a back surface side of the dial and rotates by receiving a turning force or torque from a motor; a light transmitting pointer which is provided integrally with a light transmitting pointer shaft having a hole formed in a base end part into which an end part of the rotating shaft is inserted and fixed and rotates along a surface of the dial in accordance with a rotation of the rotating shaft to indicate various kinds of information; a light-blocking cap attached to a top surface of the pointer to prevent illuminating lights from leaking outside the pointer from the top surface; and a light source which outputs the illuminating lights incident on a base end part of the rotating shaft, wherein the pointer shaft includes a first laterally light-dispersing unit formed with a recessed part recessed toward the light source in an end part over the hole, the first laterally light-dispersing unit dispersing a part of the illuminating lights incident on the pointer shaft toward the dial.

(2) The lighting structure for the meter device according to configuration (1), wherein the rotating shaft includes a second laterally light-dispersing unit formed with a recessed part recessed toward the light source in an end surface of the end part of the rotating shaft.

(3) The lighting structure for the meter device according to configuration (1) or (2), wherein the pointer shaft includes a third laterally light-dispersing unit formed to protrude toward the light source on a top surface of the hole to which the end part of the rotating shaft is attached.

(4) The lighting structure for the meter device according to any one of configurations (1) to (3), wherein the cap is provided with a first boss of a substantially cylindrical form which is inserted into a hole of the pointer.

(5) The lighting structure for the meter device according to any one of configuration (1) to (3), wherein the cap is provided with a first boss of substantially cylindrical form in an inner surface side which is inserted into the hole of the pointer and a second boss which has a diameter larger than that of the first boss is provided outside the first boss.

(6) The lighting structure for the meter device according to configuration (3), wherein an expression R1>R2 is satisfied, where the first laterally light-dispersing unit is formed with a curved surface of a radius R1 and the third laterally light-dispersing unit is formed with a curved surface of a radius R2, and a central part in the upper end part side of the pointer shaft surrounded by the first laterally light-dispersing unit and the third laterally light-dispersing unit forms a lens which converges the illuminating lights incident on the top surface of the hole of the pointer shaft from the end part of the rotating shaft.

(7) The lighting structure for the meter device according to any one of configurations (1), (2), (4) and (5), wherein the pointer shaft includes a fourth laterally light-dispersing unit formed with a recessed part recessed so as to be separated from the light source in the top surface of the hole to which the end part of the rotating shaft is attached.

In the lighting structure for a meter device according to the above-described (1), since the first laterally light-dispersing unit formed with the recessed part is provided in the upper end surface of the pointer shaft, most of optical paths of the illuminating lights are dispersed not toward the pointer, but toward the dial. Thus, not only the pointer, but also the dial can be sufficiently illuminated by the one light source.

In the lighting structure for a meter device according to the above-described (2), since the rotating shaft includes the second laterally light-dispersing unit formed to be recessed toward the light source in the end surface of the end part thereof, more illuminating lights are dispersed not toward the pointer, but toward the dial. Thus, the dial can be illuminated with a higher luminance as well as the pointer by the one light source.

In the lighting structure for a meter device according to the above-described (3), since the top surface of the hole of the pointer shaft to which the end part of the rotating shaft is attached has the third laterally light-dispersing unit formed to protrude toward the light source, more illuminating lights are dispersed not toward the pointer, but toward the dial. Thus, the dial can be illuminated with a higher luminance as well as the pointer by the one light source.

In the lighting structure for a meter device according to the above-described (4), for instance, when the light source of a high luminance is used, most of the illuminating lights advance to the pointer so that the luminance in the pointer is high. In that case, the illuminating lights are surrounded by the first boss so that the illuminating lights directed toward the pointer may be effectively interrupted.

In the lighting structure for a meter device according to the above-described (5), for instance, when the light source of a high luminance is used, most of the illuminating lights advance to the pointer so that the luminance in the pointer is high. In that case, the illuminating lights are surrounded by both the bosses so that the illuminating lights directed toward the pointer may be effectively interrupted.

In the lighting structure for a meter device according to the above-described (6), the area in the central part of the upper end of the pointer shaft surrounded by the first laterally light-dispersing unit and the third laterally light-dispersing unit forms the lens. Accordingly, the illuminating lights incident on the top surface of the hole of the pointer shaft to which the end part of the rotating shaft is attached are converged on the top surface of the hole. Thus, the illuminating lights can be converged to a part near the central part of the pointer shaft. As a result, the dial can be concentrically and effectively illuminated.

In the lighting structure for a meter device according to the above-described (7), since the pointer shaft has the fourth laterally light-dispersing unit formed to be recessed so as to be separated from the light source in the top surface of the hole to which the end part of the rotating shaft is attached, more illuminating lights are dispersed not toward the pointer, but toward the dial. Thus, the dial can be illuminated with a higher luminance as well as the pointer by the one light source.

According to the lighting structure for a meter device of the present invention, since the laterally light-dispersing unit formed with the recessed part is provided in the upper end surface of the pointer shaft, a part of the optical paths of the illuminating lights is dispersed toward the dial. Thus, a part of the illuminating lights incident on the pointer is directly used to allow the dial to emit lights and illuminate the dial by many illuminating lights. Accordingly, not only the pointer can be illuminated, but also the dial can be sufficiently illuminated by the one light source, so that a cost can be reduced.

The present invention is briefly described above. Further, a detail of the present invention will be more clarified by reading mode for carrying out the invention which will be described below by referring to the attached drawings.

DETAILED DESCRIPTION OF THE EXEMPLARY EMBODIMENTS

Now, embodiments of the present invention will be described below in detail by referring to the attached drawings. FIG. 1, FIGS. 3 to 7 and FIGS. 9 to 12 are diagrams showing cross sections. In these drawings, there are parts to which hatchings are not applied to easily discriminate optical paths of lights.

First Embodiment

Figure 1:
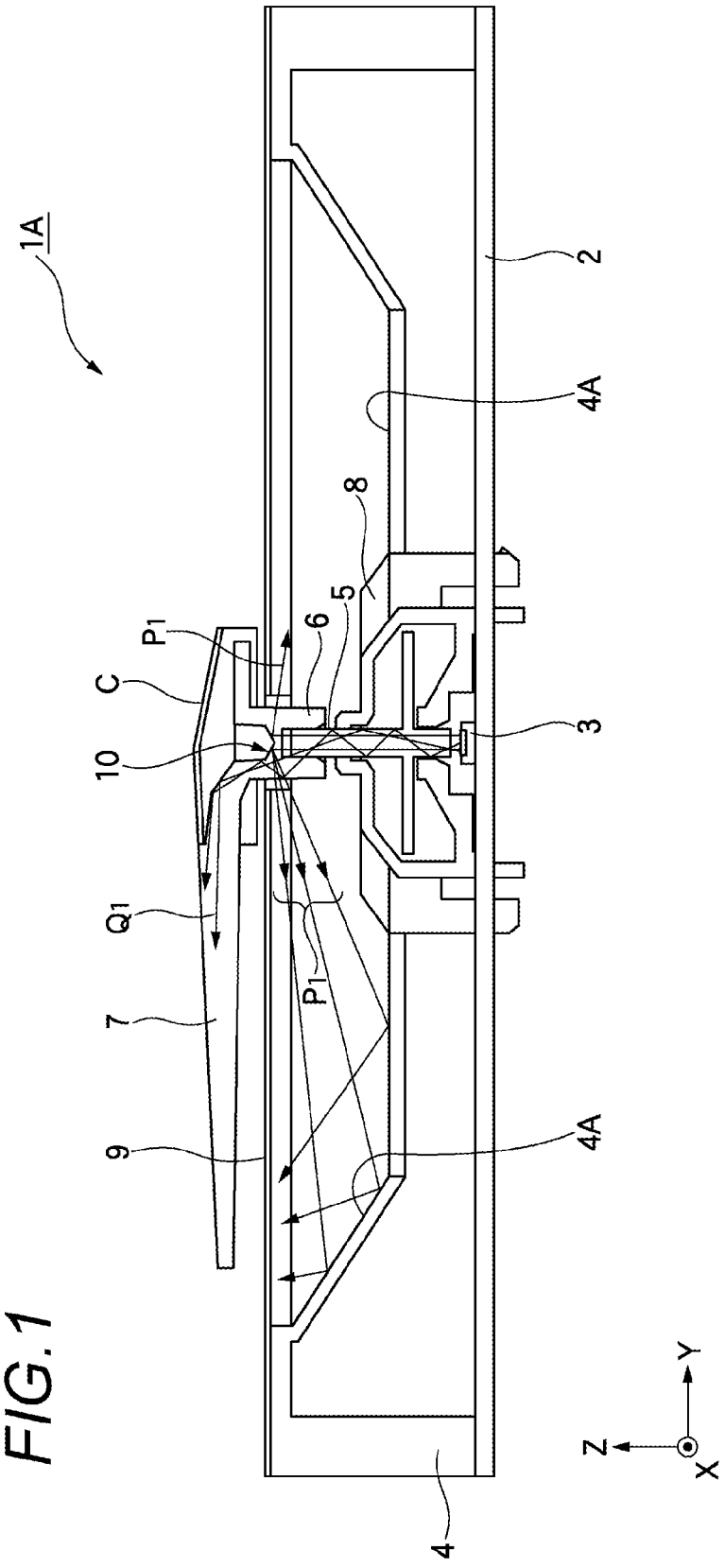
FIG. 1 is a sectional view showing a meter device to which a lighting structure for a meter device according to a first embodiment of the present invention is applied.
Figure 2A:
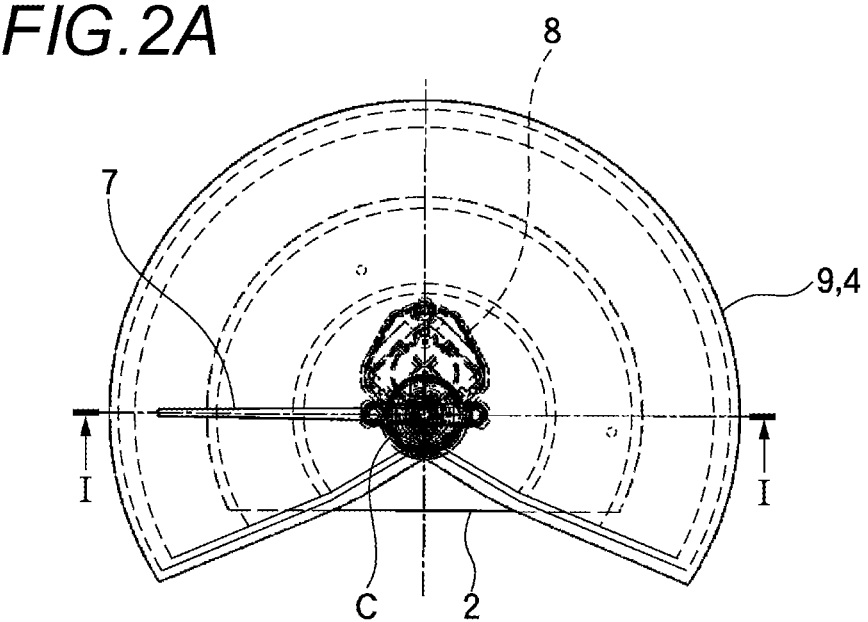
FIG. 2A is a plan view of the meter device to which the lighting structure for the meter device according to the first embodiment is applied.
Figure 2B:
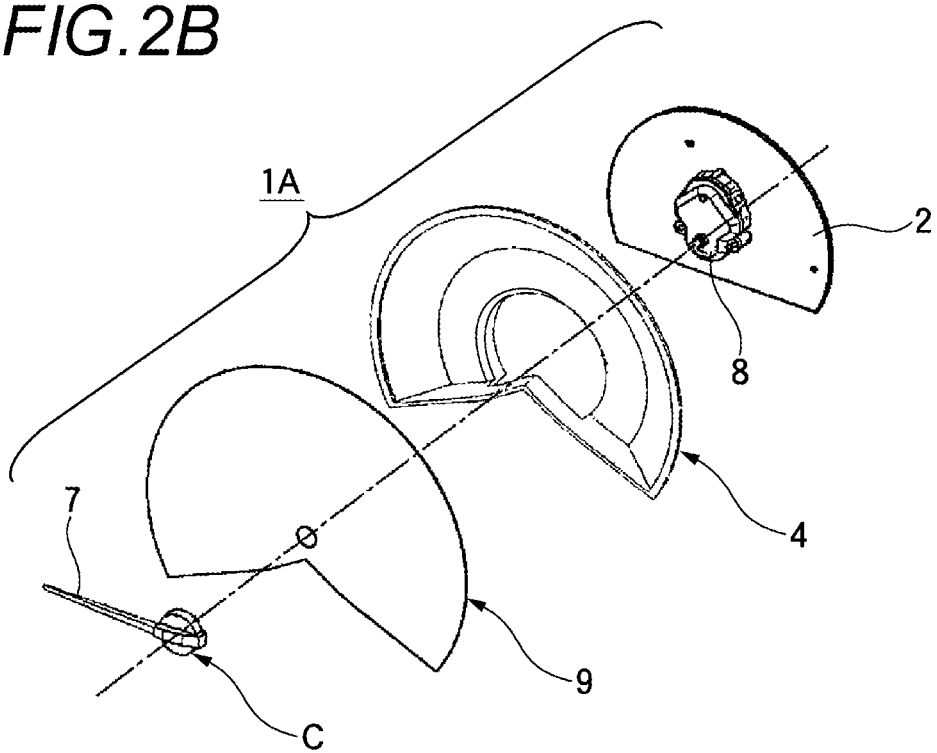
FIG. 2B is an exploded perspective view of the meter device to which the lighting structure for the meter device according to the first embodiment is applied.
Figure 3:
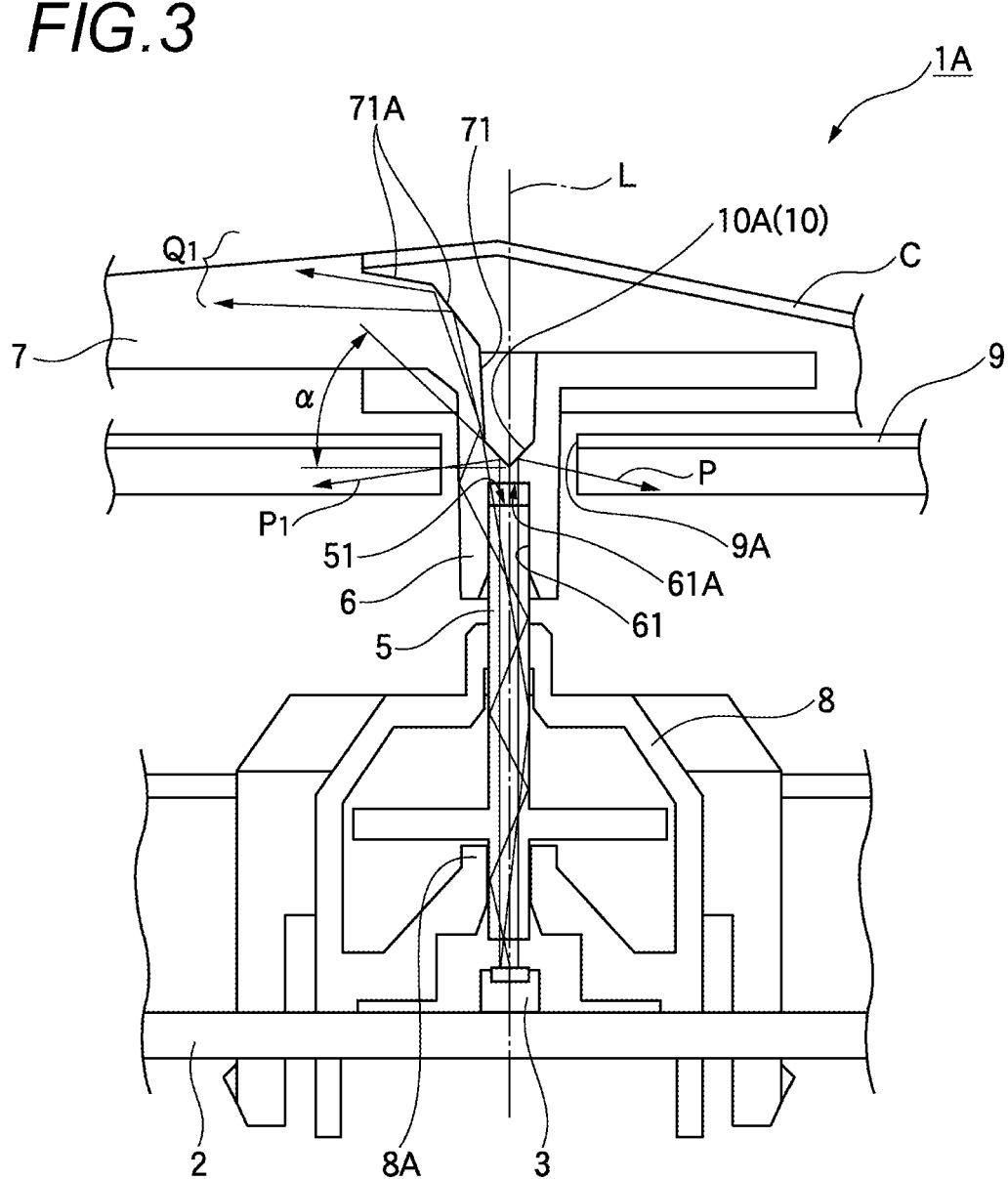
FIG. 3 is an enlarged sectional view of main parts of the meter device to which the lighting structure for the meter device according to the first embodiment is applied.

FIG. 1 to FIG. 3 show a meter device 1A to which a lighting structure for a meter device according to a first embodiment of the present invention is applied.

The meter device 1A of the present embodiment includes a light source 3 and a motor casing 8 mounted on a board 2, a casing 4 attached to a prescribed position on the board 2 including an area on which the light source 3 and the motor casing 8 are mounted, a rotating shaft 5 to which a driving force of a motor not shown in the drawing which is accommodated in the motor casing 8 to rotate, a pointer 7 provided integrally with a pointer shaft 6 attached to an end part of the rotating shaft 5, a dial 9 provided on an upper part of the casing 4 to display by the pointer 7 necessary information of numeric characters, characters, symbols or the like related to a vehicle itself or an environment in the periphery of the vehicle and a laterally light-dispersing unit 10 formed in an end part of the pointer shaft 6. Further, a top surface of a base part of the pointer 7 is covered with a cap C.

The meter device 1A of the present embodiment forms a part of a combination meter and has a periphery covered with the facing plate of a cover which is not shown in the drawing. Further, the facing plate of the cover has various kinds of display windows opened to install various kinds of meters including the meter device 1A and is formed integrally with a combination meter case forming side surface and back surface sides.

The meter device 1A of the present embodiment forms a speed meter to rotate the pointer 7 by a prescribed angle in accordance with a sensor signal, for example, corresponding to a speed detected by a sensor not shown in the drawing and indicate a specific scale formed on the dial 9.

The light source 3 of the present embodiment makes illuminating lights incident on a lower end part as a base end part of the rotating shaft 5 and is formed with, for instance, an LED (Light Emitting Diode) that outputs visible lights of prescribed wavelength ($\lambda$). The light source 3 uses output lights (refer them to as "illuminating lights", hereinafter) having a uniform output property with no directional dependence of phase angles. Namely, the light source 3 of the present embodiment has a luminous energy distribution property that a substantially uniform luminous energy is outputted in the rotating shaft 5 throughout an entire circumference with respect to a direction of a horizontal plane (an X-Y plane). The light source 3 of the present embodiment is not especially limited to the LED, but a compact point light source is optional which has a low consumed electric power.

In the casing 4, a reflecting part 4A is provided that efficiently reflects the lights (refer them as "dial lights P1", hereinafter) dispersed by the laterally light-dispersing unit 10 formed by an upper end surface as a roof surface of the below-described pointer shaft 6 in a back surface of the dial 9, that is, an inner side surface opposed to a lower surface. The reflecting part 4A may be formed with a reflection film obtained by a vapor deposition of metal such as aluminum Al, or a dielectric multilayer film having a high peak reflection property to a natural wavelength ($\lambda$) of the monochromatic illuminating lights outputted from the LED as the light source 3.

The rotating shaft 5 is a shaft rotating as described above when a turning force or torque is transmitted from the motor and has a solid and substantially cylindrical form made of a light transmitting material. The rotating shaft 5 is fitted to the pointer shaft 6 under a state that an upper end part side as the end part is inserted into a hole 61 of the pointer shaft 6. The rotating shaft 5 is fitted to the hole 61 of the pointer shaft 6 so that the pointer shaft 6 is fixed integrally to the rotating shaft 5. In the present embodiment, an upper end surface 51 of the rotating shaft 5 is not inserted to a top surface 61A of the hole 61 of the pointer shaft 6 in a close contact therewith. A gap of an air layer S is formed between the upper end surface 51 of the rotating shaft 5 and the top surface 61A of the pointer shaft 6, but, the air layer S is not especially provided between them.

The rotating shaft 5 is arranged in the back surface side of the dial 9 and has the lower end part supported by a bearing 8A provided in the motor casing 8 so as to freely rotate. To a lower end surface of the rotating shaft 5, the light source 3 is accurately opposed.

As described above, the lower end surface of the rotating shaft 5 is located over the light source 3 as shown in FIG. 3. When the illuminating lights from the light source 3 are incident, the illuminating lights are guided in the rotating shaft 5 and transmitted to the upper end part. Accordingly, in the rotating shaft 5, most of the above-described illuminating lights are totally reflected and advance to the upper end part in an interface part to an external world (air) in an outer peripheral surface of the inner part of the rotating shaft 5. In this case, a total reflection phenomenon is efficiently allowed to arise in the interface part to the external world in the outer peripheral surface of the rotating shaft 5.

In order to allow the illuminating lights to be incident on the outer peripheral surface of the rotating shaft 5 in a direction so that an incident angle is constantly larger than a natural critical angle, the lower end surface may be formed in, for instance, a shape of a circular arc in section from a central part (an axis L; see FIG. 3) of the rotating shaft 5 toward a peripheral edge part. Further, in the rotating shaft 5, the upper end surface 51 has a flat form parallel to the horizontal (X-Y) direction so as to allow the illuminating lights passing through the rotating shaft 5 to directly pass through upward from the upper end surface 51. Thus, the illuminating lights are made to be incident on the laterally light-dispersing unit 10 of the below-described pointer shaft 6 as much as possible to reflect many illuminating lights to a direction of the dial 9.

The pointer shaft 6 is formed with a material having a good light transmission property and integrally extended downward from a bottom surface side of the base part of the pointer 7. The pointer shaft 6 has the hole 61 opened in a cylindrical form in a lower end surface. The end part of the rotating shaft 5 is fitted to the hole 61. In such a way, the pointer shaft 6 is integrally attached to the rotating shaft 5 which is rotated by a turning and driving force of the motor. The pointer shaft 6 is arranged to pass through a hole 9A (see FIGS. 3 and 4) of the dial 9 in order to insert the pointer shaft 6 to the dial 9 so as to freely rotate.

The top surface 61A corresponding to a bottom of the hole 61 opened in the lower end of the pointer shaft 6 has a flat form parallel to the horizontal (X-Y) direction to avoid the illuminating lights passing though the pointer shaft 6 from leaking outside as much as possible like the upper end surface 51 of the rotating shaft 5.

Figure 4:
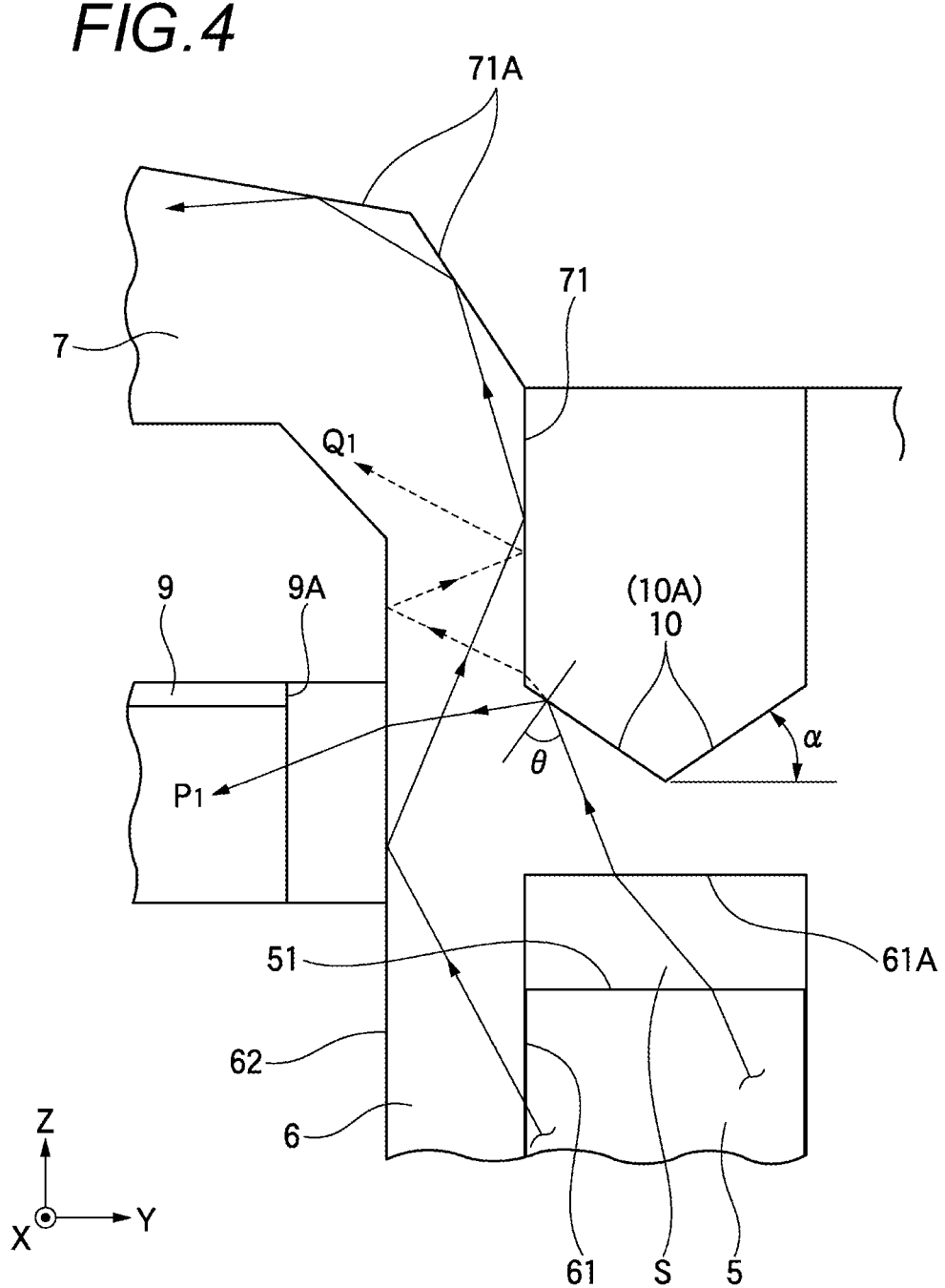
FIG. 4 is an explanatory view showing enlarged optical paths of illuminating lights on an upper end surface of a rotating shaft and an upper end surface of a pointer shaft of the meter device shown in FIG. 1.

Further, as shown in FIG. 3 and FIG. 4, the pointer shaft 6 has the upper end surface as the roof surface over the hole 61 of the pointer shaft 6 which is provided with the laterally light-dispersing unit 10 (refer it to as a "first laterally light-dispersing unit 10A", hereinafter) formed with a recessed part recessed toward the light source 3. The first laterally light-dispersing unit 10A serves to disperse a part of the illuminating lights from the light source 3 guided in the rotating shaft 5 toward the dial 9 as much as possible especially in the present embodiment. In the case of the present embodiment, the upper end surface is recessed substantially in a conical form.

The first laterally light-dispersing unit 10A reflects a part of the illuminating lights from the light source 3 which are guided in the rotating shaft 5 by the upper end surface of the pointer shaft 6 to deflect optical paths to a direction of the dial 9 so as to emit lights and illuminate the dial 9. Thus, in the first laterally light-dispersing unit 10A, a phenomenon (the Fresnel reflection) that lights are reflected on an interface to a medium (air in this case) having different refractive indexes or the total reflection phenomenon is used to disperse the reflected lights toward the dial 9. Further, remaining illuminating lights except the above-described illuminating lights, for instance, the illuminating lights which are refracted on the upper end surface of the pointer shaft 6 and slip out from the pointer shaft 6 are allowed to advance on an optical path shown by a broken line in FIG. 4 and return as much as possible. Namely, the illuminating lights are allowed to be incident again on the pointer shaft 6 and directly advance therein so as to illuminate the pointer 7.

The upper end surface of the pointer shaft 6 as the first laterally light-dispersing unit 10A of the present embodiment is, as described above, recessed substantially in the conical form so as to be inclined at a prescribed inclination angle $\alpha$ (see FIG. 3 and FIG. 4) relative to the horizontal plane. On the other hand, as well known, according to the Snell's law, the directions of the dial lights P1 which advance after the illuminating lights from the light source 3 transmitted in the rotating shaft 5 and the lower part of the pointer shaft 6 are reflected on the above-described interface depend on a refractive index of the pointer shaft 6 and an incident angle $\theta$ on the interface to the air as an external world in the pointer shaft 6. Accordingly, when the inclination angle $\alpha$ on the upper end surface of the pointer shaft 6 is changed, the incident angle $\theta$ relative to a normal in an incident point can be changed. As described above, in the directions that the dial lights P1 advance, when the inclination angle $\alpha$ is changed, the optical paths of the dial lights P1 can be suitably adjusted.

Here, the inclination angle $\alpha$ of the upper end surface of the pointer shaft 6 is set to an angle at which the dial lights P1 are generated as much as possible and many illuminating lights are transmitted to the dial 9 side in which the illuminating lights are usually somewhat insufficient. Namely, in the present embodiment, the illuminating lights which advance in the rotating shaft 5 and the lower part of the pointer shaft 6 are allowed to cause the total reflection phenomena in the interface to the external world on the upper end surface of the pointer shaft 6 as the first laterally light-dispersing unit 10A as much as possible. Accordingly, the inclination angle $\alpha$ is set to an optimum value so that the incident angle $\theta$ of the illuminating light in the incident point on the upper end surface of the pointer shaft 6 exceeds a natural critical angle ($\theta$o) determined to the wavelength $\lambda$ of the illuminating light in the light source 3.

The pointer 7 rotates along a surface of the dial 9 through the pointer shaft 6 to indicate the numeric characters or scales provided on the dial 9. As described above, the pointer 7 is formed integrally with the pointer shaft 6 by the material having the good light transmission property. The pointer 7 has in a base part side an upper hole 71 formed which has a wall surface formed as an outer peripheral surface that stands upright so as to surround the upper end surface of the pointer shaft 6 as the first laterally light-dispersing unit 10A. Further, in the pointer 7, on an upper part of the outer peripheral surface facing the upper hole 71, a deflecting surface 71A is formed to efficiently transmit the illuminating lights which are not reflected on the upper end surface of the pointer shaft 6 as the first laterally light-dispersing unit 10A of the pointer shaft 6 and are transmitted therein toward an end part of the pointer 7 as much as possible.

The motor casing 8 includes therein the motor, an intermediate gear and an output gear, which are not shown in the drawing, and the rotating shaft 5. The motor serves to rotate the pointer 7 and reduces speed through the intermediate gear and the output gear to rotate the rotating shaft 5. Thus, the pointer 7 is assuredly rotated along the surface of the dial 9 to precisely indicate various kinds of necessary information.

The dial 9 is formed with a suitable material having a light guide function in itself. The dial 9 is preferably formed with a material especially good in its light guide property. Thus, an entire part of the dial 9 can effectively emit lights and can be illuminated.

Now, an operation of the meter device 1A according to the present embodiment will be described below by referring to the drawings. In an explanation of the meter device 1A, the speed meter of various meters is exemplified and an operation of the speed meter is explained. However, the present invention is not especially limited thereto and other meter devices of an analog type may be similarly used. Further, as for the illuminating lights in FIG. 1 and FIG. 3, the directions of the optical paths are not precisely illustrated as directions that consider a refractive operation, but the directions of some optical paths are illustrated as directions that simply advance straight to easily understand the explanation as much as possible. Further, here, the refractive indexes of the rotating shaft 5 and the pointer shaft 6 are treated as the same value for convenience sake. However, it is to be understood that the refractive indexes may be different.

When the vehicle on which the meter device 1A is mounted starts to move, the motor provided in the motor casing 8 of the meter device 1A starts a rotating and driving operation in accordance with a sensor signal corresponding to a present speed detected by a sensor not shown in the drawing to rotate the pointer 7 by a prescribed angle and indicate a specific scale or numeric character formed on the dial 9.

Namely, as shown in FIG. 3, the rotating shaft 5 rotates at a prescribed angular velocity corresponding to the speed by the driving force of the motor not shown in the drawing. Thus, the pointer 7 formed integrally with the pointer shaft 6 is rotated by the prescribed angle through the pointer shaft 6 attached to the upper end part of the rotating shaft 5 to indicate the specific scale or the numeric character on the dial 9 by an end of the pointer 7. Thus, a driver can be informed of the present speed by an analog display.

In such a meter device 1A which displays the speed, the illuminating lights outputted from the light source 3 repeat a transmission phenomenon that the illuminating lights are totally reflected in the interface to the external world on the outer peripheral surface in the rotating shaft 5 and advance upward at the same time. Then, as shown in FIG. 4, a part of the illuminating lights passes through the upper end part of the rotating shaft 5 and the air layer S and reaches the first laterally light-dispersing unit 10A recessed substantially in the conical form in the upper end part of the center of the pointer shaft 6. Most of the illuminating lights incident on the upper end surface as the first laterally light-dispersing unit 10A from an inner part of the pointer shaft 6 satisfy a critical condition.

Accordingly, after most of the illuminating lights are totally reflected on the first laterally light-dispersing unit 10A as the upper end surface of the pointer shaft 6, their optical paths are deflected transversely, that is, to sideward directions from upward directions and directed to the external dial 9 from the outer peripheral surface of the pointer shaft 6. Namely, the illuminating lights become the dial lights P1. Then, the dial lights P1 are reflected again toward the dial 9 by the reflecting part 4A provided in the inner side surface of the casing 4 on their advancing optical paths. Thus, the dial 9 can be allowed to emit lights and illuminated from a back surface side.

On the other hand, as shown in FIG. 4, most of the illuminating lights incident on the inner part of the pointer shaft 6 from the rotating shaft 5 are totally reflected between an outer peripheral surface 62 and the upper hole 71 of the pointer 7 and advance to an inner part of the pointer 7. Then, in the deflecting surface 71A, advancing optical paths of the illuminating lights are deflected toward the end of the pointer 7 so that the illuminating lights become pointer lights Q1 which allow the pointer 7 to emit lights and illuminate the pointer 7.

It is to be understood that a transmitting operation of the illuminating lights in the rotating shaft 5 and a spectral reflecting operation on the upper end of the pointer shaft 6 are completely similarly carried out without a change from those under a steady state even during a rotating operation of the rotating shaft 5. Accordingly, even when the rotating shaft 5 rotates, not only the pointer 7 can be allowed to emit lights and illuminated, but also the dial 9 can be allowed to emit lights and illuminated at the same time by many illuminating lights from the same light source 3.

As described above, according to the present embodiment, most of the optical paths of the illuminating lights incident on the pointer 7 are dispersed toward the dial 9 by the first laterally light-dispersing unit 10A provided on the upper end surface of the end part of the pointer shaft 6. Thus, most of the illuminating lights which are previously arranged to be incident on the pointer 7 can be formed as the dial lights P1. Thus, most of the illuminating lights can be used as the light emission and illumination in the dial 9. Accordingly, a plurality of light sources do not need to be provided just below the dial 9 and only one light source 3 may be used to sufficiently illuminate both the pointer 7 and the dial 9 at the same time.

Second Embodiment

Figure 5:
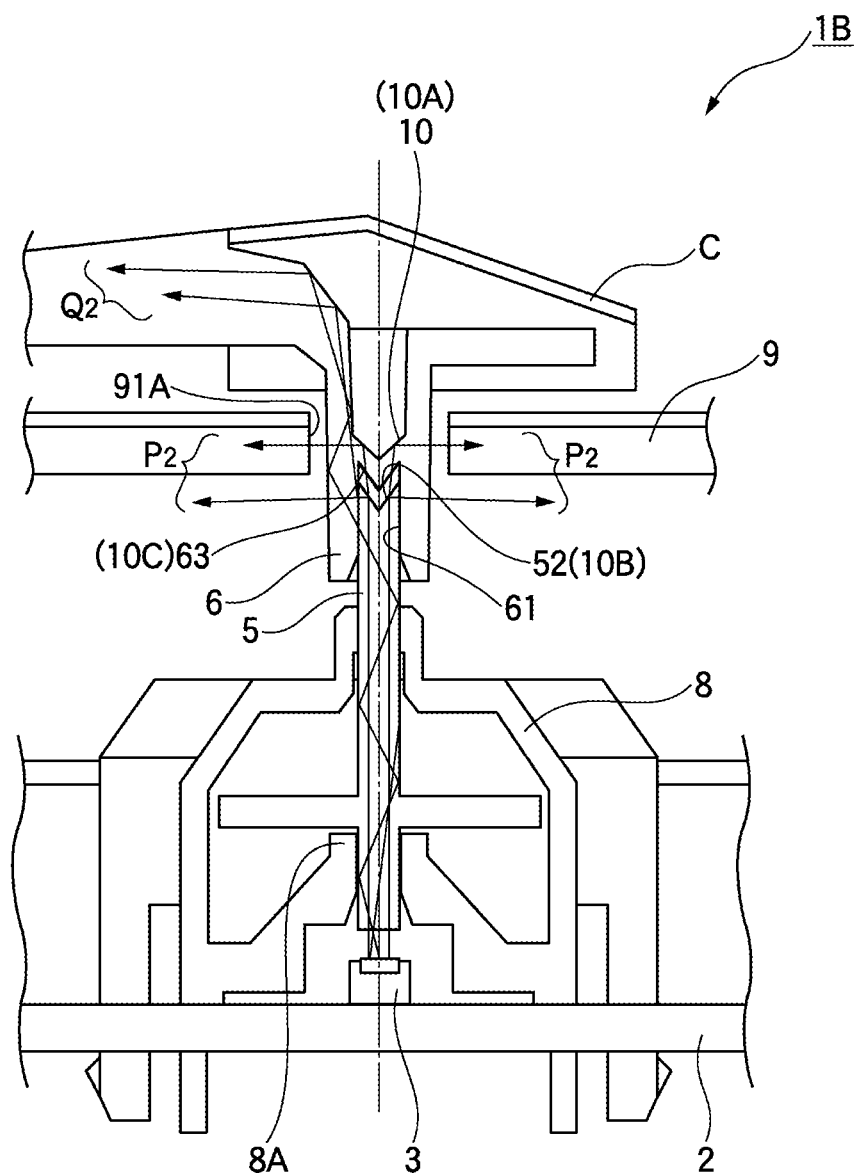
FIG. 5 is an enlarged sectional view of main parts of a meter device to which a lighting structure for a meter device according to a second embodiment of the present invention is applied.

Now, a second embodiment of the present invention will be described below by referring to FIG. 5 and FIG. 6. In the present embodiment, the same parts as those of the first embodiment are designated by the same reference numerals and a duplicated explanation is avoided.

Different points of a meter device 1B of the second embodiment to which a lighting structure of the present invention is applied from the meter device 1A of the first embodiment reside in that an upper end surface 52 as an end surface of an end part of a rotating shaft 5 has a second laterally light-dispersing unit 10B recessed toward a light source 3 and a top surface 63 of a hole 61 of a pointer shaft 6 to which the end part of the rotating shaft 5 is attached has a third laterally light-dispersing unit 10C protruding toward the light source 3.

The upper end surface 52 of the rotating shaft 5 as the second laterally light-dispersing unit 10B is recessed in a conical form. The second laterally light-dispersing unit 10B of the present embodiment has an inclination of an inclined surface which has the same angle as an inclination angle α of an upper end surface of the pointer shaft 6 as a first laterally light-dispersing unit 10A.

Similarly, the top surface 63 of the hole 61 of the pointer shaft 6 as the third laterally light-dispersing unit 10C is recessed in the same conical form as that of the upper end surface of the pointer shaft 6 as the first laterally light-dispersing unit 10A. Accordingly, the top surface 63 of the hole 61 of the pointer shaft 6 of the present embodiment has an inclination angle which is the same angle as the inclination angles α of the first laterally light-dispersing unit 10A and the second laterally light-dispersing unit 10B. Thus, the inclined surfaces of the three laterally light-dispersing units mutually have a parallel relation.

Now, optical paths of illuminating lights in the present embodiment will be described in detail by referring to FIGS. 5 and 6. In order to easily understand an explanation herein, the rotating shaft 5 and the pointer shaft 6 in which the illuminating lights advance are supposed to have the same refractive index and an interposition of air between both the shafts is supposed to be negligible. Therefore, a refraction phenomenon is supposed to be absent between both the shafts. Further, the optical paths illustrated in FIG. 6 show typical optical paths that most of the illuminating lights from the light source 3 trace and advance, and all the illuminating lights do not trace and advance in the optical paths of the illustrated pattern.

Most of the illuminating lights outputted from the light source 3 repeat a transmission phenomenon that the illuminating lights generate a total reflection in an interface to an external world on an outer peripheral surface in the rotating shaft 5 and advance upward. Then, as shown in FIG. 6, a part of the illuminating lights is regularly reflected in an interface at an angle γ to an air layer S in the second laterally light-dispersing unit 10B as the upper end surface 52 in the rotating shaft 5, then, incident on the pointer shaft 6, directly refracted on an outer peripheral surface and outputted to an external part. Accordingly, such an illuminating light is subsequently directed to a dial 9. Thus, a dial light P2' is formed from a part of the illuminating lights which are previously arranged to be incident on a pointer 7 so as to be a pointer light Q2 and can be used for a light transmission and illumination in the dial 9.

Figure 6:
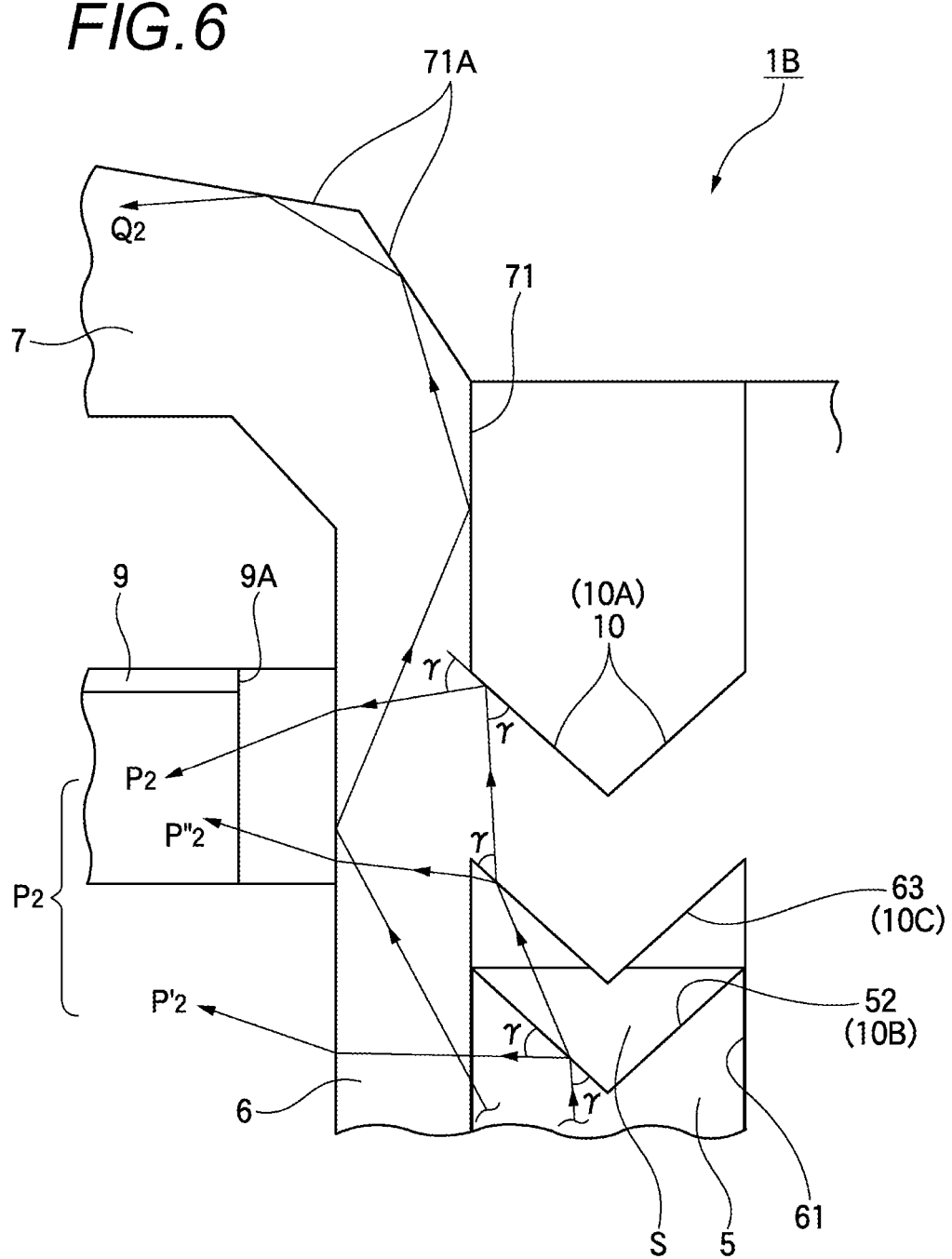
FIG. 6 is an explanatory view showing enlarged optical paths of illuminating lights on an upper end surface of a rotating shaft and an upper end surface of a pointer shaft of the meter device.

Further, as shown in FIG. 6, a part of the illuminating lights which reaches an incident point of the interface to the air layer S in the second laterally light-dispersing unit 10B is refracted therein and slips out to the air layer S, then, directly advances in the air layer S and reaches the top surface 63 of the hole 61 of the pointer shaft 6. In the top surface 63, a part of the illuminating lights is regularly reflected, then, refracted from an inner peripheral surface of the hole 61 to be incident on an inner part of the pointer shaft 6. Then, the illuminating light advances in the pointer shaft 6 so as to traverse the pointer shaft 6, is refracted on the outer peripheral surface and slips out to an external part of the pointer shaft 6. Accordingly, since the illuminating light is subsequently directed to the dial 9, a dial light P2" is formed as a part of the illuminating lights which are previously arranged to be incident on the pointer 7. Thus, the dial light can be used for the light transmission and illumination in the dial 9.

Further, a part of remaining illuminating lights which are refracted on the top surface 63 of the hole 61 of the pointer shaft 6 and advance in the pointer shaft 6 is regularly reflected by the first laterally light-dispersing unit 10A in the upper end surface in the pointer shaft 6, then advances therein so as to traverse the pointer shaft 6, is refracted on the outer peripheral surface and slips out to an external part of the pointer shaft 6. Accordingly, since the illuminating light is also subsequently directed to the dial 9, a dial light P2' is formed as a part of the illuminating lights which are previously arranged to be incident on the pointer 7. Thus, the dial light can be used for the light transmission and illumination in the dial 9.

Thus, according to the present embodiment, three kinds of dial lights P2, P2' and P2" can be formed which trace three kinds of optical paths toward the dial 9 by the first laterally light-dispersing unit 10A to the third laterally light-dispersing unit 10C. Accordingly, a quantity of illuminating lights can be made to be more uniform to each surface of the dial 9 than that of the first embodiment.

Third Embodiment

Now, a third embodiment of the present invention will be described below by referring to FIG. 7 and FIG. 8. In the third embodiment, the same parts as those of the first and second embodiments are designated by the same reference numerals and a duplicated explanation is avoided.

A different point of a meter device 1C of the present embodiment to which a lighting structure of the present invention is applied from the meter device 1B of the second embodiment resides in that bosses BS are provided double in a cap C'.

Figure 8:
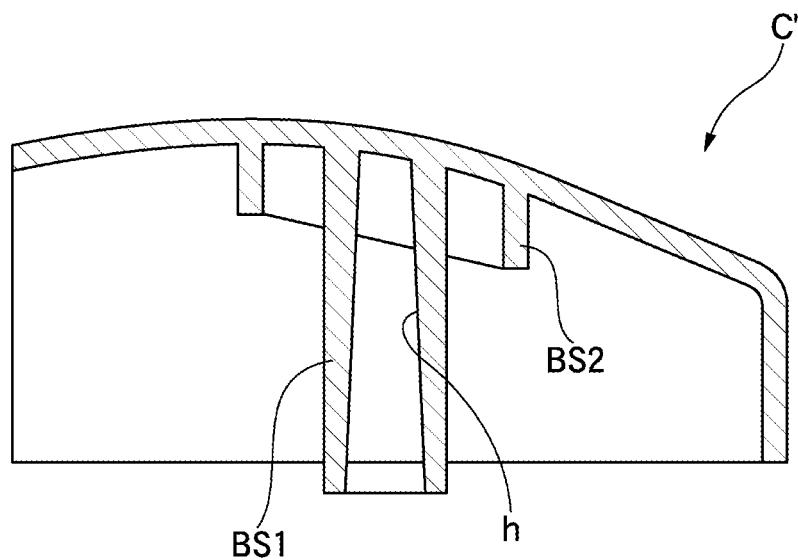
FIG. 8 is a sectional view showing a structure of a cap used in the meter device to which the lighting structure for the meter device according to the third embodiment is applied.

As shown in FIG. 8, the cap C' has a first boss BS1 having a longitudinally long cylindrical form which is provided in a central part and a second boss BS2 having a short and oblique cylindrical form of a large diameter which is provided outside the first boss BS1. The bosses BS1 and BS2 are provided vertically downward from an inner surface.

Figure 7:
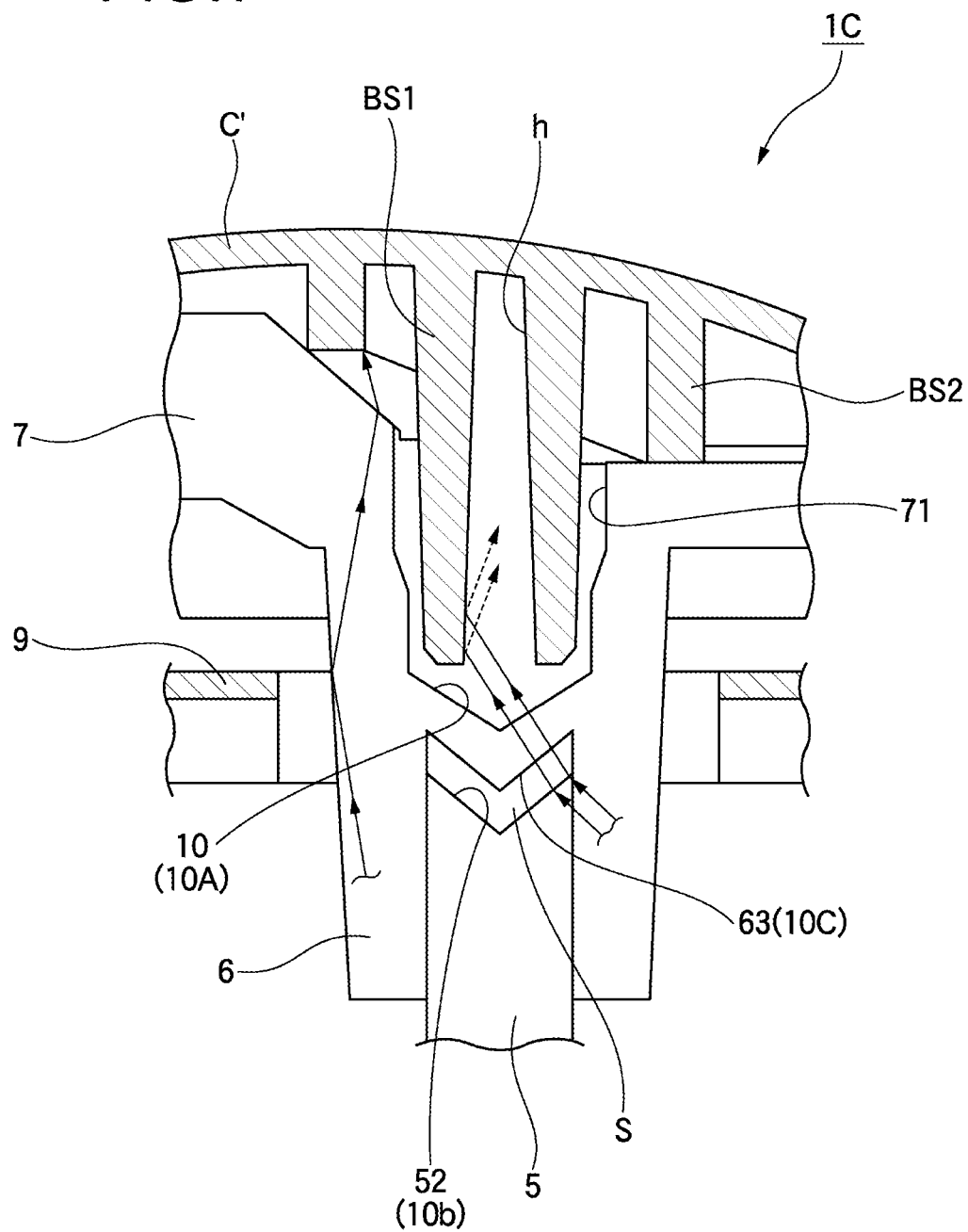
FIG. 7 is an enlarged sectional view of main parts of a meter device to which a lighting structure for a meter device according to a third embodiment of the present invention is applied.

As shown in FIG. 7, the first boss BS1 is inserted into an upper hole 71 of a pointer 7 provided over a pointer shaft 6. Thus, illuminating lights entering an inner hole h are absorbed or damped to suppress the luminance of the pointer 7 and prevent the pointer 7 from being excessively illuminated. When the illuminating lights are absorbed or damped by the first boss BS1, an axial length (height) of the first cylindrical boss BS1, a diameter or the thickness of a wall surface defining the first boss BS1 is suitably adjusted so that the luminance of the illuminating lights may be adjusted. On the other hand, the second boss BS2 is allowed to abut on an upper surface, that is, a surface of the pointer 7 so as to be engaged therewith. Thus, when the illuminating lights leak out from the upper surface of the pointer 7, the second boss BS2 absorbs or damps the illuminating lights like the first boss BS1 to suppress the luminance of the pointer 7. Further, a halation caused by the illuminating lights is suppressed by the first and second bosses BS1 and BS2.

Accordingly, in the present embodiment, since the first and second bosses BS1 and BS2 are provided, for instance, when a white LED having a high luminance is used as a light source 3, an inconvenience can be avoided that the luminance of the pointer 7 is increased to give a strong stimulation to the eye of a person who visually recognizes the pointer. In other words, even when a crimp work is not applied to the pointer 7, the luminance can be conveniently effectively suppressed.

Figure 9:
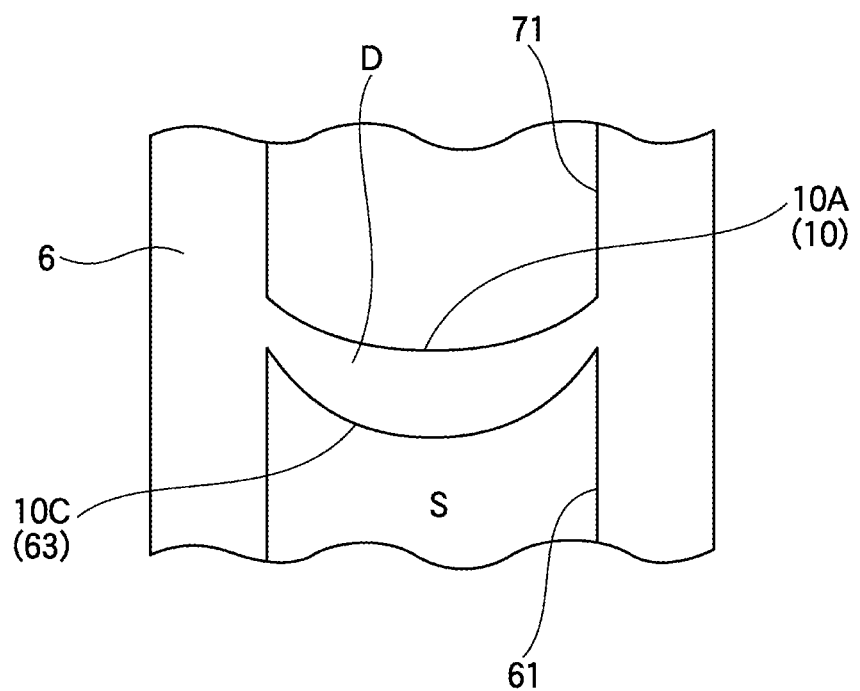
FIG. 9 is an enlarged explanatory view of main parts showing a modified example of the meter device to which the lighting structure for the meter device according to the third embodiment is applied.

In the present invention, as shown in FIG. 9, an upper end surface of the pointer shaft 6 as a first laterally light-dispersing unit 10A may be formed with a first curved surface of a radius R1, and a top surface 63' of a hole 61 of the pointer shaft 6 as a third laterally light-dispersing unit 10C may be formed with a second curved surface of a radius R2.

In that case, the radius R1 of the first curved surface of the first laterally light-dispersing unit 10A may be formed so as to satisfy a below-described expression so that the radius R1 of the first curved surface is larger than the radius R2 of the second curved surface of the third laterally light-dispersing unit 10C.

$$R1 > R2 \qquad \text{(Expression)}$$

In the pointer shaft 6 having such a structure, an area D in a central part side of the upper end of the pointer shaft 6 surrounded by the first and second curved surfaces of the first and third laterally light-dispersing units 10A and 10C may be allowed to function as a convex lens which converges the illuminating lights incident on the top surface 63' of the hole 61 of the pointer shaft 61 from an end part of a rotating shaft 5.

Accordingly, in the case of the above-described structure, when the illuminating lights incident on the top surface 63' of the hole 61 of the pointer shaft 6 pass through the area D, if the illuminating lights are excessively converged so that the illuminating lights are liable to be concentrated to one position of the pointer 7, a part of the illuminating lights can be effectively reduced by the first and second bosses BS1 and BS2. Accordingly, the increase of the luminance in the pointer 7 can be avoided.

Further, in the present embodiment, since the first boss BS1 is pressed-in to the upper hole 71 to fix the cap C' to the pointer 7, a backlash of the cap C' to the pointer 7 can be prevented.

Fourth Embodiment

Figure 10:
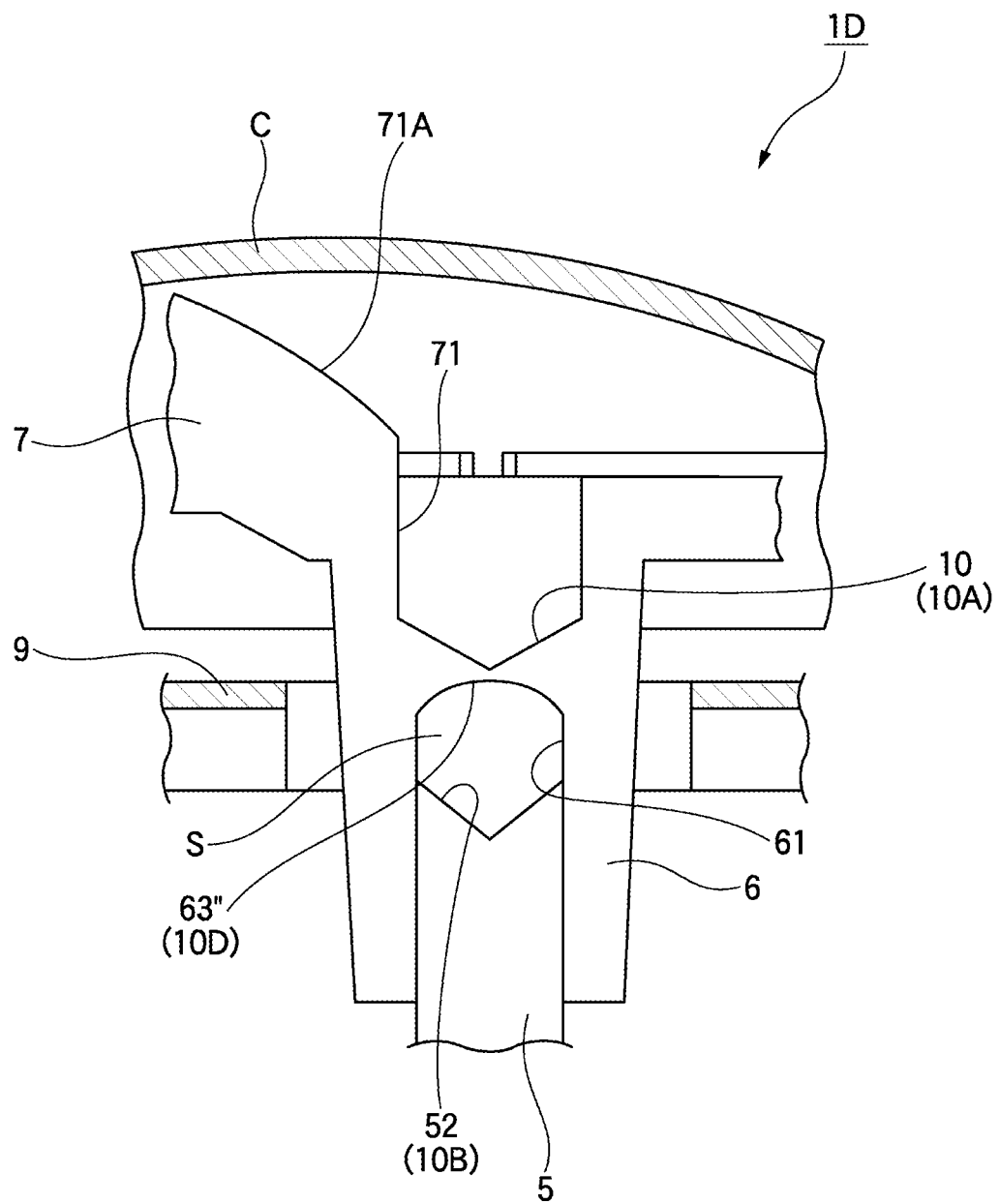
FIG. 10 is an enlarged sectional view of main parts of a meter device to which a lighting structure for a meter device according to a fourth embodiment of the present invention is applied.
Figure 11:
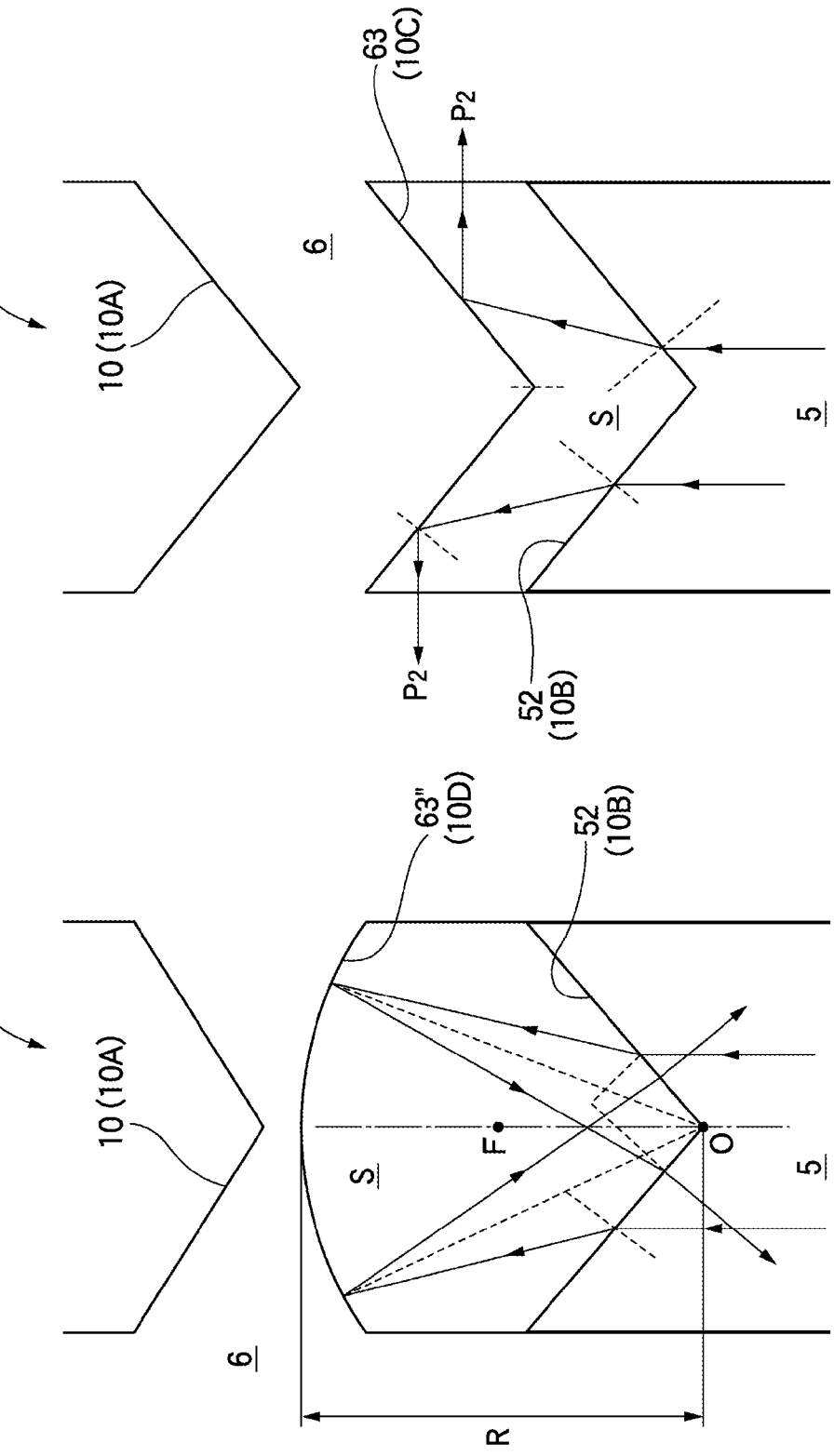
FIG. 11A is an optical path diagram showing optical paths of illuminating lights in main parts of the meter device.
FIG. 11B is an optical path diagram showing optical paths of illuminating lights in main parts of the second embodiment which is used to be compared with FIG. 11A.

Now, a fourth embodiment of the present invention will be described below by referring to FIG. 10, FIG. 11A and FIG. 11B. In the present embodiment, the same parts as those of the first to third embodiments are designated by the same reference numerals and a duplicated explanation is avoided.

A different point of a meter device 1D of the fourth embodiment to which a lighting structure of the present invention is applied from the second meter device 1B resides in that a top surface 63" of a hole 61 of a pointer shaft 6 forms a fourth laterally light-dispersing unit 10D as a substantially dome shaped ceiling recessed so as to be separated from a light source 3.

In the present embodiment, the fourth laterally light-dispersing unit 10D has, for instance, a form of a curved surface with a circular arc as a part of the circumference of a radius R and has a function as a concave mirror. Accordingly, for instance, as shown in FIG. 11A, when illuminating lights passing through a second laterally light-dispersing unit 10B as an upper end surface 52 of a rotating shaft 5 are incident on the top surface 63", a part of the illuminating lights is regularly reflected with respect to each segment (shown by a broken line in FIG. 11A) that connects a specular center O to an incident point thereof as a reference. Then, the illuminating light passes through an air layer S and is incident again on the second laterally light-dispersing unit 10B as the upper end surface 52 of the rotating shaft 5.

As described above, in the fourth laterally light-dispersing unit 10D, the illuminating lights which advance substantially along an axial direction in the vicinity of the center of the rotating shaft 5 are not diffused much and allowed to be incident again on the rotating shaft 5 from the second laterally light-dispersing unit 10B. Accordingly, a part of the illuminating lights from a light source not shown in the drawing is not supplied toward a pointer 7. Namely, since the illuminating lights can be extinguished, even when a white LED of a high luminance is used as the light source, a strong stimulation can be avoided from being given to the eye of a person who visually recognizes the pointer.

In FIG. 11A, symbol F designates a focal point of the concave mirror of the radius R formed by the top surface 63" as the fourth laterally light-dispersing unit 10D and has a distance from the top surface 63" corresponding to a specular surface which is a half as long as the radius R.

On the other hand, in the case of, for instance, the meter device 1B of the second embodiment, most of the illuminating lights passing through the second laterally light-dispersing unit 10B as the upper end surface 52 of the rotating shaft 5 are regularly reflected outward in the third laterally light-dispersing unit 10C as the top surface 63. Accordingly, under a state that most of the illuminating lights which advance substantially along an axis in the vicinity of the center of the rotating shaft 5 are diffused, the illuminating lights are incident on the pointer shaft 6. Accordingly, in the case of the meter device 1B of the second embodiment, the dial lights P2 can be formed by the third laterally light-dispersing unit 10C. Namely, in the case of the meter device 1B of the second embodiment shown in FIG. 11B, the dial 9 can be allowed to effectively emit lights even by the light source which outputs the illuminating lights of arbitrary wavelength that are liable to have insufficient luminance.

Thus, according to the present embodiment, since the fourth laterally light-dispersing unit 10D is provided, the illuminating lights from the light source not shown in the drawing can be extinguished. Accordingly, even when the white LED is used as the light source, the strong stimulation can be avoided from being given to the eye of the person who visually recognizes the pointer.

Fifth Embodiment

Figure 12:
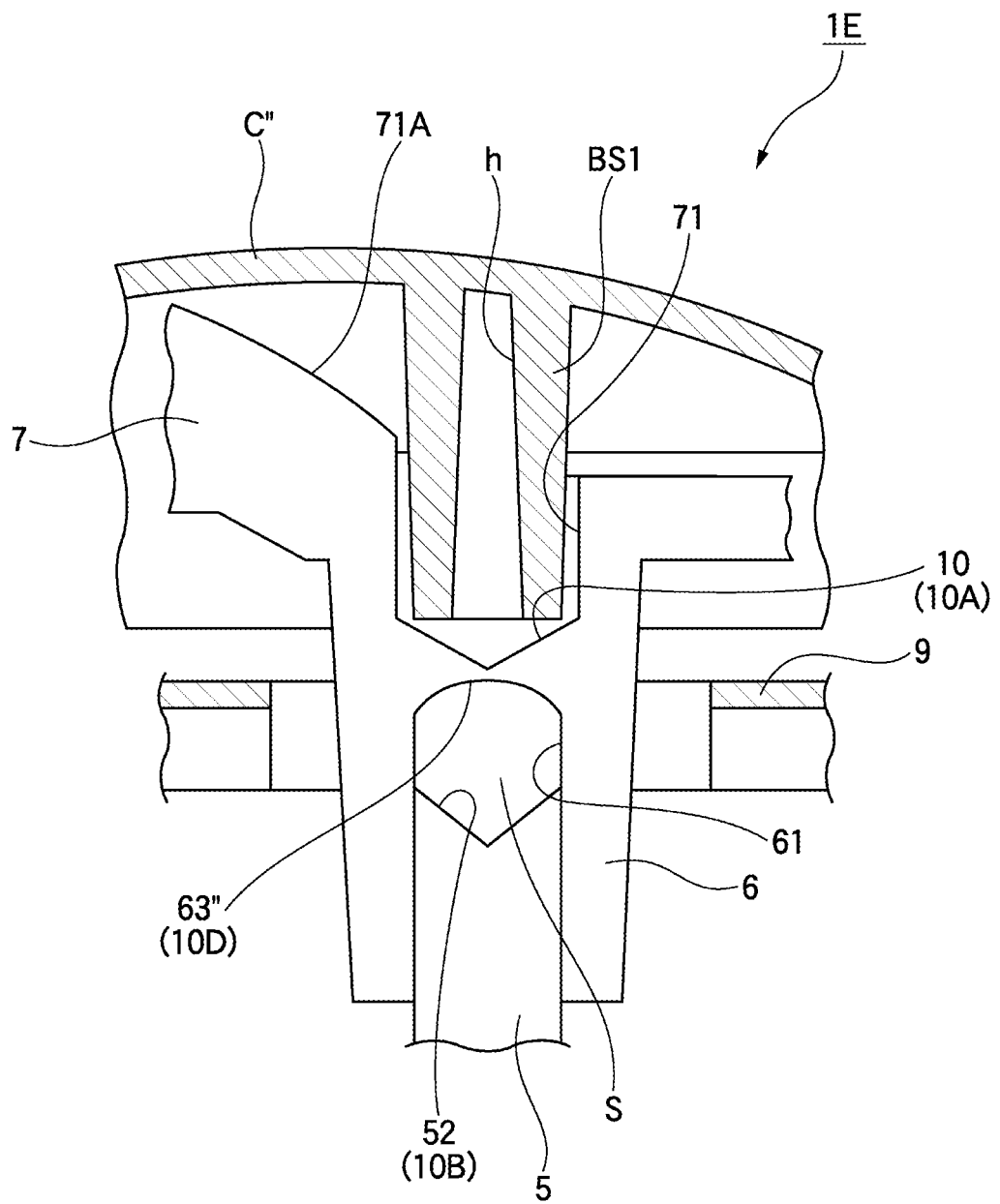
FIG. 12 is an enlarged sectional view of main parts of a meter device to which a lighting structure for a meter device according to a fifth embodiment of the present invention is applied.
Figure 13:
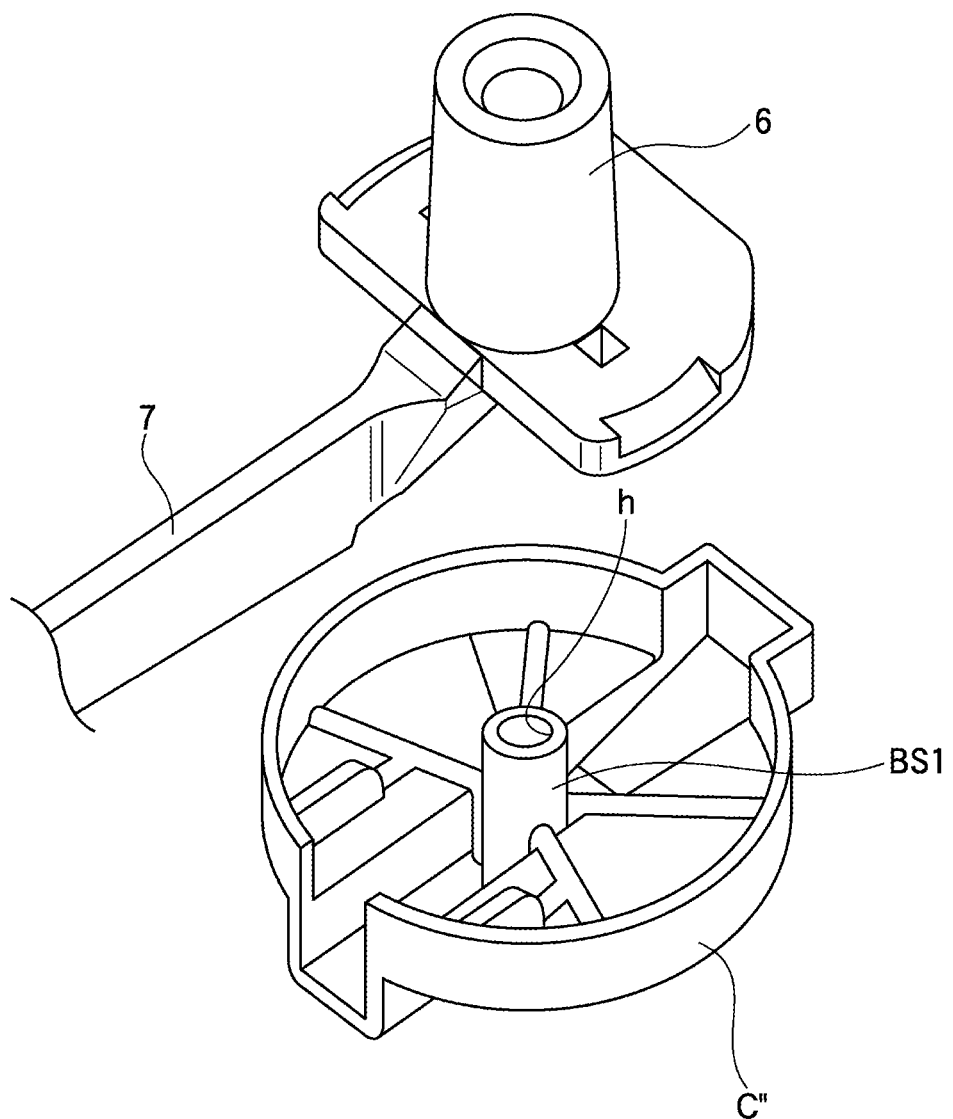
FIG. 13 is a perspective view of a pointer and a cap to which the lighting structure for the meter device according to the fifth embodiment of the present invention is applied.
Figure 14:
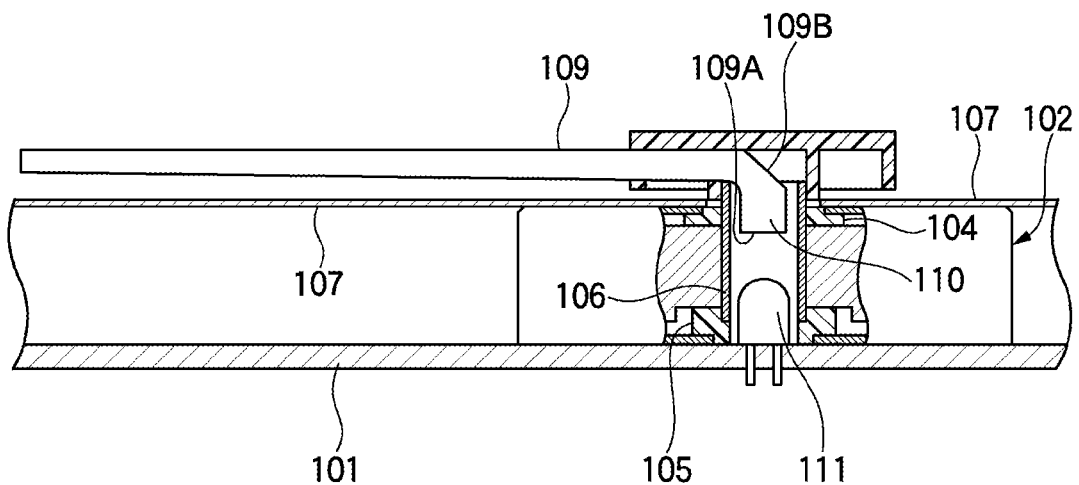
FIG. 14 is a sectional view showing main parts of a meter device to which a usual lighting structure for a meter device is applied.
Figure 15:
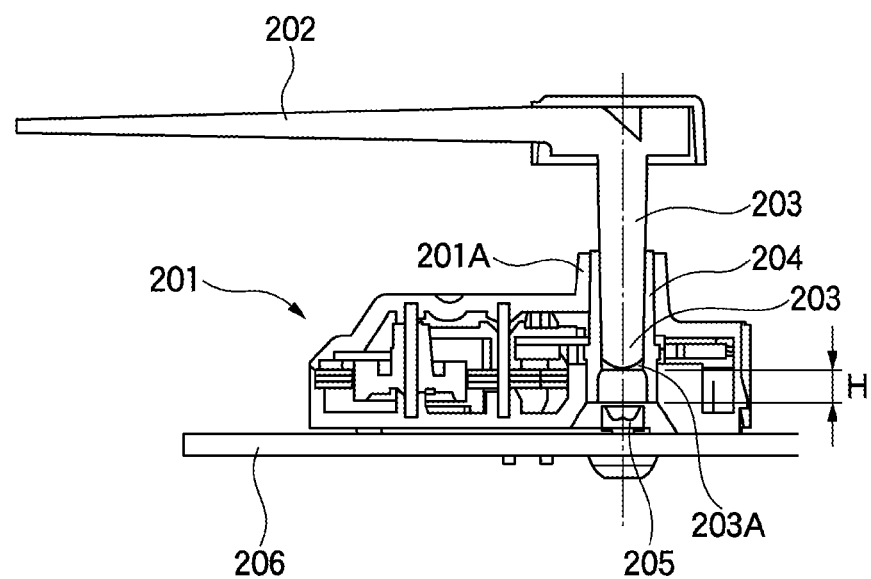
FIG. 15 is a sectional view of main parts of a meter device to which another usual lighting structure for a meter device is applied.

Now, a fifth embodiment of the present invention will be described below by referring to FIG. 12 and FIG. 13.

In the present embodiment, the same parts as those of the first to fourth embodiments are designated by the same reference numerals and a duplicated explanation is avoided.

A different point of a meter device 1E of the present embodiment to which a lighting structure of the present invention is applied from the meter device 1D of the fourth embodiment resides in that a cap C" is provided with a first cylindrical boss BS1.

The cap C" has the same structure as that of the cap C' of the third embodiment from which the second boss BS2 is removed. Accordingly, the first boss BS1 has the same function as that of the first boss BS1 of the third embodiment. That is, the first boss BS1 is inserted into an upper hole 71 of a pointer 7 provided over a pointer shaft 6 to absorb or damp illuminating lights entering an inner hole h of the boss BS1. Thus, the luminance of the pointer 7 is suppressed and the pointer 7 can be prevented from being excessively illuminated. When the illuminating lights are absorbed or damped by the first boss BS1, an axial length (height) of the first cylindrical boss BS1, a diameter or the thickness of a wall surface defining the first boss BS1 is suitably adjusted so that the luminance of the illuminating lights may be adjusted.

Further, in the present embodiment, a fourth laterally light-dispersing unit 10D is provided like the meter device 1D of the fourth embodiment. Accordingly, under a state that most of the illuminating lights which advance substantially along an axis in the vicinity of the center of a rotating shaft 5 are not diffused, the illuminating lights are incident again on parts near the center in the rotating shaft 5 from a second laterally light-dispersing unit 10B. Thus, the illuminating lights from a light source not shown in the drawing can be extinguished. As a result, even when a white LED of a high luminance is used as the light source, a strong stimulation can be avoided from being given to the eye of a person who visually recognizes the pointer.

Further, in the present embodiment, since the first boss BS1 is pressed-in to the upper hole 71 to fix the cap C" to the pointer 7, a backlash of the cap C" to the pointer 7 can be prevented.

The present invention is not limited to the above-described embodiments, and various kinds of forms may be embodied within a scope which does not deviate from the gist thereof. Namely, the present invention may be applied to various kinds of meters such as a fuel meter part, a tachometer part, a speed meter part and water temperature gauge.

As described in the third embodiment, the area in the central part of the upper end side of the pointer shaft 6 surrounded by the first laterally light-dispersing unit and the third laterally light-dispersing unit may be formed with a unit having a function as the convex lens. However, the present invention is not especially limited thereto. Namely, a radius of curvature R1 of the first laterally light-dispersing unit 10A and a radius of curvature R2 of the third laterally light-dispersing unit 10C may have a relation of a below-described expression.

$$R1 < R2 \qquad \text{(Expression)}$$

Namely, the area in the central part side of the upper end of the pointer shaft surrounded by the first laterally light-dispersing unit 10A and the third laterally light-dispersing unit 10C may have a function as a concave lens that diffuses the illuminating lights incident on a top surface of a hole of a pointer shaft from an end part of the rotating shaft.

What is claimed is:

1. A lighting structure for a meter device, comprising:
   a dial;
   a rotating shaft that transmits light, the rotating shaft being provided in a back surface side of the dial and rotates by receiving a turning force or torque from a motor;
   a light transmitting pointer which is provided integrally with a light transmitting pointer shaft having a hole formed in a base end part into which an end part of the rotating shaft is inserted and fixed and rotates along a surface of the dial in accordance with a rotation of the rotating shaft to indicate various kinds of information;
   a light-blocking cap attached to a top surface of the pointer to prevent illuminating lights from leaking outside the pointer from the top surface; and a light source which outputs the illuminating lights incident on a base end part of the rotating shaft, wherein the pointer shaft includes a first laterally light-dispersing unit formed with a recessed part recessed toward the light source in an end part over the hole, the first laterally light-dispersing unit dispersing a part of the illuminating lights incident on the pointer shaft toward the dial, and the dial includes a side end face that receives the part of the illuminating lights dispersed by the first laterally light-dispersing unit.

2. The lighting structure for the meter device according to claim 1, wherein the rotating shaft includes a second laterally light-dispersing unit formed with a recessed part recessed toward the light source in an end surface of the end part of the rotating shaft.

3. The lighting structure for the meter device according to claim 1, wherein the pointer shaft includes a third laterally light-dispersing unit formed to protrude toward the light source on a top surface of the hole to which the end part of the rotating shaft is attached.

4. The lighting structure for the meter device according to claim 3, wherein an expression R1>R2 is satisfied, where the first laterally light-dispersing unit is formed with a curved surface of a radius R1 and the third laterally light-dispersing unit is formed with a curved surface of a radius R2, and a central part in the upper end part side of the pointer shaft surrounded by the first laterally light-dispersing unit and the third laterally light-dispersing unit forms a lens which converges the illuminating lights incident on the top surface of the hole of the pointer shaft from the end part of the rotating shaft.

5. The lighting structure for the meter device according to claim 1, wherein the cap is provided with a first boss of a substantially cylindrical form which is inserted into a hole of the pointer.

6. The lighting structure for the meter device according to claim 1, wherein the cap is provided with a first boss of substantially cylindrical form in an inner surface side which is inserted into the hole of the pointer and a second boss which has a diameter larger than that of the first boss is provided outside the first boss.

7. The lighting structure for the meter device according to claim 1, wherein the pointer shaft includes a fourth laterally light-dispersing unit formed with a recessed part recessed so as to be separated from the light source in the top surface of the hole to which the end part of the rotating shaft is attached.

8. The lighting structure for the meter device according to claim 1, wherein the base end part of the rotating shaft is a bottom most surface of the rotating shaft.

9. A lighting structure for a meter device, comprising:

a dial including a first major surface, a second major surface, and a side surface connecting the first major surface to the second major surface;

a rotatable pointer configured to point towards information on the dial; and a light source configured to illuminate the dial and the rotatable pointer, wherein light from the light source enters the rotatable pointer and is output from the rotatable pointer into the side surface of the dial in order to illuminate the dial.

* * * * *